United States Patent
Kasutani et al.

(10) Patent No.: US 7,457,460 B2
(45) Date of Patent: Nov. 25, 2008

(54) PICTURE RETRIEVING APPARATUS AND METHOD WHICH CONVERTS ORTHOGONAL TRANSFORM COEFFICIENTS INTO COLOR HISTOGRAM DATA

(75) Inventors: Eiji Kasutani, Tokyo (JP); Akio Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/802,457

(22) Filed: May 23, 2007

(65) Prior Publication Data

US 2007/0223837 A1    Sep. 27, 2007

Related U.S. Application Data

(62) Division of application No. 10/362,682, filed as application No. PCT/JP01/07461 on Aug. 30, 2001, now Pat. No. 7,400,765.

(30) Foreign Application Priority Data

Sep. 6, 2000 (JP) ............................... 2000-270700

(51) Int. Cl.
*G06K 9/00* (2006.01)
*G06K 9/36* (2006.01)

(52) U.S. Cl. ....................................... 382/165; 382/170

(58) Field of Classification Search ................. 382/162, 382/164, 165, 168, 170, 190, 248, 250, 272, 382/276, 305; 358/515, 522; 345/600–604; 707/2–4, 100, 102; 386/107
See application file for complete search history.

(56) References Cited

U.S. PATENT DOCUMENTS 4,646,250 A  2/1987  Childress
4,672,683 A  6/1987  Matsueda
4,716,404 A  12/1987  Tabata et al.

(Continued)

FOREIGN PATENT DOCUMENTS

JP          7-073195         3/1995

(Continued)

OTHER PUBLICATIONS

Yamada et al., "Wadai no. Seihin to Gijitsu; Image kara no Chou-Kousouku Eizou Kensaku Houshiki," Gazou Labo, (Jun. 2000), vol. 11(6):31-35.

(Continued)

*Primary Examiner*—Amir Alavi
(74) *Attorney, Agent, or Firm*—Foley & Lardner LLP

(57) ABSTRACT

The picture retrieving apparatus includes: an orthogonal conversion coefficient memory 13 of a retrieval target picture storing an orthogonal conversion coefficient of a picture targeted for a retrieval; a picture feature amount converter 2 converting an orthogonal conversion coefficient 21 read from the orthogonal conversion coefficient memory 13 of the retrieval target picture into a color histogram information; and a color histogram similarity calculator 4 calculating a similarity 42 between a color histogram information 41 of a query picture and a color histogram information 25 generated by the picture feature amount converter 2. It unifies the kinds of the picture feature amounts to calculate the similarity between the picture feature amounts. Thus, it can specify the picture similar to the query picture from the retrieval target picture, on the basis of the calculated similarity.

8 Claims, 9 Drawing Sheets

U.S. PATENT DOCUMENTS

| | | | | |
|---|---|---|---|---|
| 4,829,453 | A | 5/1989 | Katsuta et al. | |
| 4,944,023 | A | 7/1990 | Imao et al. | |
| 5,012,334 | A | 4/1991 | Etra | |
| 5,148,522 | A | 9/1992 | Okazaki | |
| 5,179,652 | A | 1/1993 | Rozmanith et al. | |
| 5,202,828 | A | 4/1993 | Vertelney et al. | |
| 5,220,648 | A | 6/1993 | Sato | |
| 5,381,158 | A | 1/1995 | Takahara et al. | |
| 5,421,008 | A | 5/1995 | Banning et al. | |
| 5,428,727 | A | 6/1995 | Kurosu et al. | |
| 5,434,966 | A | 7/1995 | Nakazawa et al. | |
| 5,579,471 | A | 11/1996 | Barber et al. | |
| 5,647,058 | A | 7/1997 | Agrawal et al. | |
| 5,737,020 | A * | 4/1998 | Hall et al. | 375/240.2 |
| 5,751,286 | A | 5/1998 | Barber et al. | |
| 5,852,823 | A | 12/1998 | De Bonet | |
| 5,893,095 | A | 4/1999 | Jain et al. | |
| 6,072,936 | A * | 6/2000 | Koyama | 386/95 |
| 6,249,607 | B1 | 6/2001 | Murakawa | |
| 6,269,358 | B1 | 7/2001 | Hirata | |
| 6,345,275 | B2 | 2/2002 | Lee | |
| 6,411,730 | B1 | 6/2002 | Bartell et al. | |
| 6,463,432 | B1 | 10/2002 | Murakawa | |
| 6,493,462 | B1 | 12/2002 | Inoue | |
| 6,563,959 | B1 | 5/2003 | Troyanker | |
| 6,711,287 | B1 * | 3/2004 | Iwasaki | 382/165 |
| 6,754,667 | B2 * | 6/2004 | Kim et al. | 707/102 |
| 6,845,176 | B1 | 1/2005 | Sezan | |
| 6,895,050 | B2 * | 5/2005 | Lee | 375/240.03 |
| 6,990,233 | B2 | 1/2006 | Park et al. | |
| 7,006,689 | B2 * | 2/2006 | Kasutani | 382/165 |
| 7,006,881 | B1 * | 2/2006 | Hoffberg et al. | 700/83 |
| 7,039,255 | B2 | 5/2006 | Lee | |
| 7,046,865 | B2 * | 5/2006 | Kasutani | 382/305 |
| 2006/0147186 | A1 * | 7/2006 | Kasutani et al. | 386/107 |
| 2007/0223837 | A1 * | 9/2007 | Kasutani et al. | 382/276 |

FOREIGN PATENT DOCUMENTS

| | | |
|---|---|---|
| JP | 10-055433 A | 2/1997 |
| JP | 9-234343 A | 9/1997 |
| JP | 9-33-407 A | 12/1997 |
| JP | 10-247246 A | 9/1998 |
| JP | 10-301948 A | 11/1998 |
| JP | 11-066107 | 3/1999 |
| JP | 11-096368 | 4/1999 |
| JP | 11-102439 A | 4/1999 |
| JP | 11-328422 | 11/1999 |
| JP | 11-361819 | 11/1999 |
| JP | 11-316837 A | 12/1999 |
| JP | 2000-48181 | 2/2000 |
| JP | 2000-194727 | 7/2000 |
| JP | 2000-259832 A | 9/2000 |

OTHER PUBLICATIONS

Shimuzu "Color Johou ni chakumoku shita Gazou Kensaku Houhou no Kenkyuu," Nihon Kogyo Daigaku Kenkyuu Houkoku, (Aug. 1999), vol. 29(2):321-324.

* cited by examiner

Fig. 7

| | NORMALIZING AVERAGE RETRIEVAL ORDER |
|---|---|
| PICTURE FEATURE AMOUNT2 | 0.30 |
| PICTURE FEATURE AMOUNT3 | 0.33 |

Fig. 8

| | NORMALIZING AVERAGE RETRIEVAL ORDER |
|---|---|
| PICTURE FEATURE AMOUNT1 | 0.52 |
| PICTURE FEATURE AMOUNT4 | 0.55 |

PICTURE RETRIEVING APPARATUS AND METHOD WHICH CONVERTS ORTHOGONAL TRANSFORM COEFFICIENTS INTO COLOR HISTOGRAM DATA

CROSS-REFERENCE TO RELATED PATENT APPLICATIONS

This application is a division of application Ser. No. 10/362,682, filed Mar. 4, 2003 now U.S. Pat. No. 7,400,765; which is the U.S. National Stage of PCT/JP01/07461, filed Aug. 30, 2001, and which claims priority from Japanese Patent Application No. 2000-270700, filed Sep. 6, 2000, by Eiji Kasutani and Akio Yamada, both of which are incorporated herein by reference in their entirety. This application claims only subject matter disclosed in the parent application and therefore presents no new matter.

TECHNICAL FIELD

The present invention relates to a picture retrieving apparatus and a picture retrieving method, and a recording medium for recording a picture retrieving program. More particularly, the present invention relates to a picture retrieving apparatus and a picture retrieving method for retrieving a similar picture after unifying kinds of picture feature amounts in a system in which different kinds of picture feature amounts are mixed, and a recording medium for recording a program of the same method.

BACKGROUND ART

Typically, a picture retrieving apparatus and a picture retrieving method using a feature of a picture have been traditionally used to retrieve a similar picture from accumulated pictures.

This kind of a conventional picture retrieving technique employs a method of calculating a color histogram information contained in a picture and then retrieving a similar picture based on its similarity. Here, the color histogram information implies a picture feature amount composed of representative colors indicative of the pictures and its configuration rate. As the color histogram information, it is possible to use a histogram with regard to all colors contained in the picture, a histogram composed of one or a plurality of representative colors and its color configuration rate, and the like.

On the contrary, an example of a picture retrieving apparatus using an orthogonal conversion coefficient of the picture as the picture feature amount is disclosed in Japanese Laid Open Patent Application (Japanese Patent Application Number; Heisei, 11-059432) filed by the same applicant. Here, the orthogonal conversion coefficient of the picture is composed of a value indicative of an energy for each band, which is obtained by dividing a frequency distribution of a spectrum of a color (average color) of the picture into a plurality of bands, and carrying out a frequency analysis by using an orthogonal matrix.

FIG. 9 is a block diagram showing the configuration of the main portion of this conventional picture retrieving apparatus, and shows the picture retrieving apparatus including: a picture feature amount generator 102 for generating a feature amount 103 from a picture data 101; a feature amount memory 104 for storing a feature amount in advance; and a similarity calculator 106 for calculating a similarity 107 between the feature amount 103 and a feature amount 105 contained in the feature amount memory 104.

Here, the picture feature amount generator 102 is composed of: a contraction picture generator 110 for generating a contraction picture 111 from the picture data 101; a frequency analyzer 112 for performing a frequency analysis on the contraction picture 111; and a direct current component and partially alternating current component extractor 114 for extracting as the picture feature amount 103 a direct current component and a partially alternating component from the orthogonal conversion coefficient 113 obtained from the frequency analyzer 112.

Also, an example of the conventional picture retrieving apparatus in which the picture feature amounts are mixed is disclosed in Japanese Laid Open Patent Application (JP-A-Heisei, 09-237343).

FIG. 10 is a block diagram showing the configuration of the main portion of this conventional picture retrieving apparatus. It includes: an input unit 201 for inputting a picture feature amount; a picture feature amount memory 202 for storing the picture feature amount; and a similarity calculator 203 for calculating a similarity between the picture feature amount inputted from the input unit 201 and the picture feature amount stored in the picture feature amount memory 202.

The picture feature amount memory 202 is composed of an orthogonal conversion coefficient memory 204 for storing an orthogonal conversion coefficient of the picture; and a color histogram memory 205 for storing a color histogram information. The similarity calculator 203 is composed of a picture feature amount judging unit 206, a color histogram similarity calculator 207 and an orthogonal conversion coefficient similarity calculator 208.

The picture feature amount judging unit 206 judges whether a picture feature amount 209 inputted from the input unit 201 is the color histogram information or the orthogonal conversion coefficient. If it is judged as the color histogram information by the picture feature amount judging unit 206, the color histogram similarity calculator 207 calculates a similarity 212 between a picture feature amount 210 composed of a color histogram information outputted by the picture feature amount judging unit 206 and a color histogram information 211 read from the color histogram memory 205. If it is judged as the orthogonal conversion coefficient by the picture feature amount judging unit 206, the orthogonal conversion coefficient similarity calculator 208 calculates a similarity 215 between a picture feature amount 213 composed of an orthogonal conversion coefficient outputted by the picture feature amount judging unit 206 and an orthogonal conversion coefficient 214 read from the orthogonal conversion coefficient memory 204.

However, the above-mentioned apparatuses in the respective conventional examples have the following various problems.

As a first problem, the conventional apparatus can not carry out a comparative retrieval between different kinds of picture feature amounts. For example, if a picture feature amount of a query picture is the orthogonal conversion coefficient, the retrieval can not be performed on a database including a color histogram information of a retrieval target picture as the feature amount.

As a second problem, in order to attain the retrieval corresponding to the plurality of kinds of picture feature amounts, the similarity calculators corresponding to the respective picture feature amounts are required to thereby result in a large size of the configuration of the retrieving system. Namely, if the plurality of kinds of picture feature amounts are included, it is necessary to jointly have the similarity calculators corresponding to all the kinds of the picture feature amounts. So, the size of the similarity calculator is made larger. Also, if the plurality of kinds of similarity calculators are included, the picture feature amounts are required for all the similarity calculators.

As a third problem, a raw picture is required when the different kinds of the picture feature amounts are generated. This is because the picture feature amount is extracted from the raw picture.

Japanese Laid Open Patent Application (JP-A-Heisei, 10-301948) discloses the following method of retrieving a picture and an image. It investigates a spatial distribution of a color in an exemplification picture proposed as a retrieval key, and thereby divides the exemplification picture into a plurality of parts (1). It divides the exemplification picture and a retrieval target picture into a plurality of roughness as blocks, and calculates a color histogram in each block (2). It compares the part with the color histogram in the block, for the exemplification picture and the retrieval target picture, and extracts the block constituting the part, and then generates a part picture indicative of a region constituting the part after a hierarchical lamination (3). Next, it calculates an adjacent histogram in which a position relation between the parts is represented as a histogram, by using this part picture (4). Finally, it compares the adjacent histogram obtained from the exemplification picture with the adjacent histogram obtained from the retrieval target picture, and accordingly judges the presence or absence of a subject in the retrieval target picture (5).

Japanese Laid Open Patent Application (JP-A-Heisei, 11-102439) discloses the following method of retrieving a subject in a picture. At first, it investigates a spatial distribution of a color in a retrieval key picture in the subject, and divides into a plurality of parts (1). It divides the retrieval key picture and a retrieval target picture into blocks, and calculates a color histogram in each block (2). It generates a part picture indicating the sureness that each point in the retrieval key picture and the retrieval target picture belongs each part, by using a color histogram matching in which a similarity of a color is reflected (3). It calculates an adjacent histogram representative of a position relation between the parts, by using the part picture (4). Next, it updates a value of the sureness with regard to the part picture generated from the retrieval target picture by using this adjacent histogram, and suppresses an influence on background (5). Finally, it compares the adjacent histograms calculated from the part pictures of the updated retrieval target picture and the retrieval key picture with each other (6), and accordingly judges the presence or absence of the subject in the retrieval target picture (7).

Japanese Laid Open Patent Application (JP-A-Heisei, 11-316819) discloses the following picture retrieving apparatus. With regard to each of a plurality of picture data, a picture feature amount extractor 14 divides a picture into a plurality of blocks, and calculates a feature amount for each block. A feature amount labeling unit 15 gives a label on the basis of the feature amount of each block, and generates a label histogram information indicative of a histogram of the given label, and also records in a picture management database 18, and then records in a component index 19 from which a picture IG of the picture including the label and the included number can be retrieved with each label as a key. A pattern matching unit 16 establishes a retrieval target label to be defined as a retrieval condition and its range of the included number, and refers to the component index 19 under the established retrieval condition, and then extracts the picture.

By the way, as the U.S patents in relation to this application, there are U.S. Pat. No. 4,646,250 February, 1987 Childress 395/149, U.S. Pat. No. 4,672,683 June, 1987 Matsueda 382,305, U.S. Pat. No. 4,716,404 December, 1987 Tabata et al. 395/164, U.S. Pat. No. 4,829,453 May, 1989 Katusta et al. 382/305, U.S. Pat. No. 4,944,023 July, 1990 Imao et al. 382/240, U.S. Pat. No. 5,012,334 April, 1991 Etra 348/107, U.S. Pat. No. 5,148,522 September, 1992 Okazaki 395/161, U.S. Pat. No. 5,179,652 January, 1993 Rozmanith et al. 395/155, U.S. Pat. No. 5,202,828 April., 1993 Vertelney et al. 395/159, U.S. Pat. No. 5,220,648 June, 1993 Sato 395/155, U.S. Pat. No. 5,381,158 January, 1995 Takahara et al. 395/161, U.S. Pat. No. 5,421,008 May, 1995 Banning et al. 395/600, U.S. Pat. No. 5,428,727 June, 1995 Kurosu et al. 395/155, U.S. Pat. No. 5,434,966 July, 1995 Nakazawa et al. 395/161, U.S. Pat. No. 5,579,471 November, 1996 Barber et al. 395/326, U.S. Pat. No. 5,647,058 July, 1997 Agrawal et al. 395/326, U.S. Pat. No. 5,852,823 December, 1998 De Bonet 707/6, U.S. Pat. No. 5,893,095 April, 1999 Jain et al. 707/6, and U.S. Pat. No. 6,269,358 July, 2001 Hirata.

The present invention is accomplished in view of the above mentioned problems. Therefore, a first object of the present invention is to provide a picture retrieving apparatus and a picture retrieving method that can carry out a retrieval, whether a picture feature amount is an orthogonal conversion coefficient of a picture or a color histogram information, in a system in which a picture retrieval using the color histogram information of the picture and a picture retrieval using the orthogonal conversion coefficient of the picture are mixed, and a recording medium for recording a retrieval program.

A second object of the present invention is to provide a picture retrieving apparatus and a picture retrieving method that can simplify the system configuration without any large loss of a retrieving performance, in a system in which a picture retrieval using a color histogram information of a picture and a picture retrieval using an orthogonal conversion coefficient of the picture are mixed, and a recording medium for recording a retrieval program.

DISCLOSURE OF INVENTION

A picture retrieving apparatus of the present invention includes: an orthogonal conversion coefficient memory storing a plurality of orthogonal conversion coefficients of a plurality of retrieval target pictures targeted for a retrieval; a picture feature amount converter converting the orthogonal conversion coefficient read from the orthogonal conversion coefficient memory into a color histogram information; and a color histogram similarity calculator calculating a similarity between a color histogram information of a query picture and the color histogram information generated by the picture feature amount converter.

A picture retrieving method of the present invention includes: a step of storing a plurality of orthogonal conversion coefficients of a plurality of retrieval target pictures targeted for a retrieval in an orthogonal conversion coefficient memory; a picture feature amount converting step of converting the orthogonal conversion coefficient read from the orthogonal conversion coefficient memory into a color histogram information; and a color histogram similarity calculating step of calculating a similarity between a color histogram information of a query picture and the color histogram information generated by the picture feature amount converting step, and wherein a similar picture to the query picture is specified from the plurality of retrieval target pictures, based on a plurality of the calculated similarities.

A recording medium of the present invention is a recording medium that can be read in by a computer, which records a program for instructing a computer to execute the respective steps described in the picture retrieving method of the present invention.

A picture retrieving apparatus of the present invention includes: an orthogonal conversion coefficient memory storing a plurality of orthogonal conversion coefficients of a plurality of retrieval target pictures targeted for a retrieval; a picture feature amount converter converting the orthogonal conversion coefficient read from the orthogonal conversion coefficient memory into a color histogram information; a second picture feature amount converter converting an orthogonal conversion coefficient of a query picture into a color histogram information; and a color histogram similarity calculator calculating a similarity between the color histogram information generated by the second picture feature amount converter and the color histogram information generated by the picture feature amount converter.

A picture retrieving method of the present invention includes: a step of storing a plurality of orthogonal conversion coefficients of a plurality of retrieval target pictures targeted for a retrieval in an orthogonal conversion coefficient memory; a picture feature amount converting step of converting the orthogonal conversion coefficient read from the orthogonal conversion coefficient memory into a color histogram information; a second picture feature amount converting step of converting an orthogonal conversion coefficient of a query picture into a color histogram information; and a color histogram information similarity calculating step of calculating a similarity between the color histogram information generated by the second picture feature amount converting step and the color histogram information generated by the picture feature amount converting step, and wherein a similar picture to the query picture is specified from the plurality of retrieval target pictures, based on a plurality of the calculated similarities.

A recording medium of the present invention is a recording medium that can be read in by a computer, which records a program for instructing a computer to execute the respective steps described in the picture retrieving method of the present invention.

A picture retrieving apparatus of the present invention includes: a color histogram memory storing a plurality of color histogram information of a plurality of retrieval target pictures targeted for a retrieval; a picture feature amount converter converting an orthogonal conversion coefficient of a query picture into a color histogram information; and a color histogram similarity calculator calculating a similarity between the color histogram information generated by the picture feature amount converter and the color histogram information read from the color histogram memory.

A picture retrieving method of the present invention includes: a step of storing a plurality of color histogram information of a plurality of retrieval target pictures targeted for a retrieval in a color histogram memory; a picture feature amount converting step of converting an orthogonal conversion coefficient of a query picture into a color histogram information; and a color histogram information similarity calculating step of calculating a similarity between the color histogram generated by the picture feature amount converting step and the color histogram information read from the color histogram memory, and wherein a similar picture to the query picture is specified from the plurality of retrieval target pictures, based on a plurality of the calculated similarities.

A recording medium of the present invention is a recording medium that can be read in by a computer, which records a program for instructing a computer to execute the respective steps described in the picture retrieving method of the present invention.

In the picture retrieving apparatus of the present invention, the picture feature amount converter includes: a reversely orthogonal converter decoding a orthogonal conversion coefficient of a picture to convert into a picture; and a color histogram information generator extracting a color histogram information of the converted picture.

In the picture retrieving apparatus of the present invention, each of the picture feature amount converter and the second picture feature amount converter includes: a reversely orthogonal converter decoding a orthogonal conversion coefficient of a picture to convert into a picture; and a color histogram information generator extracting a color histogram information of the converted picture.

In the picture retrieving apparatus of the present invention, the picture feature amount converter includes: a reversely orthogonal converter decoding a orthogonal conversion coefficient of a picture to convert into a picture; and a color histogram information generator extracting a color histogram information of the converted picture.

In the picture retrieving method of the present invention, the picture feature amount converting step includes: a reversely orthogonally converting step of decoding a orthogonal conversion coefficient of a picture to convert into a picture; and a color histogram information generating step of extracting a color histogram information of the converted picture.

In the picture retrieving method of the present invention, each of the picture feature amount converting step and the second picture feature amount converting step includes: a reversely orthogonally converting step of decoding a orthogonal conversion coefficient of a picture to convert a picture; and a color histogram information generating step of extracting a color histogram information of the converted picture.

In the picture retrieving method of the present invention, the picture feature amount converting step includes: a reversely orthogonally converting step of decoding a orthogonal conversion coefficient of a picture to convert into the picture; and a color histogram information generating step of extracting a color histogram information of the converted picture.

A recording medium of the present invention is a recording medium that can be read in by a computer, which records a program for instructing a computer to execute the respective steps described in the picture retrieving method of the present invention.

A recording medium of the present invention is a recording medium that can be read in by a computer, which records a program for instructing a computer to execute the respective steps described in the picture retrieving method of the present invention.

A recording medium of the present invention is a recording medium that can be read in by a computer, which records a program for instructing a computer to execute the respective steps described in the picture retrieving method of the present invention.

A picture retrieving apparatus of the present invention includes: a color histogram memory storing a plurality of color histogram information of a plurality of retrieval target pictures targeted for a retrieval; a picture feature amount converter converting the color histogram information read from the color histogram memory into an orthogonal conversion coefficient; and an orthogonal conversion coefficient similarity calculator calculating a similarity between an orthogonal conversion coefficient of a query picture and the orthogonal conversion coefficient generated by the picture feature amount converter.

A picture retrieving method of the present invention includes: a step of storing a plurality of color histogram information of a plurality of retrieval target pictures targeted for a retrieval in a color histogram memory; a picture feature amount converting step of converting the color histogram information read from the color histogram memory into an orthogonal conversion coefficient; and an orthogonal conversion coefficient similarity calculating step of calculating a similarity between an orthogonal conversion coefficient of a query picture and the orthogonal conversion coefficient generated by the picture feature amount converting step, and wherein a similar picture to the query picture is specified from the plurality of retrieval target pictures, based on a plurality of the calculated similarities.

A recording medium of the present invention is a recording medium that can be read in by a computer, which records a program for instructing a computer to execute the respective steps described in the picture retrieving method of the present invention.

A picture retrieving apparatus of the present invention includes: a color histogram memory storing a plurality of color histogram information of a plurality of retrieval target pictures targeted for a retrieval; a picture feature amount converter converting the color histogram information read from the color histogram memory into an orthogonal conversion coefficient; a second picture feature amount converter converting a color histogram information of a query picture into an orthogonal conversion coefficient; and an orthogonal conversion coefficient similarity calculator calculating a similarity between the orthogonal conversion coefficient generated by the second picture feature amount converter and the orthogonal conversion coefficient generated by the picture feature amount converter.

A picture retrieving method of the present invention includes: a step of storing a plurality of color histogram information of a plurality of retrieval target pictures targeted for a retrieval in a color histogram memory; a picture feature amount converting step of converting the color histogram information read from the color histogram memory into an orthogonal conversion coefficient; a second picture feature amount converting step of converting a color histogram information of a query picture into an orthogonal conversion coefficient; and an orthogonal conversion coefficient similarity calculating step of calculating a similarity between the orthogonal conversion coefficient generated by the second picture feature amount converting step and the orthogonal conversion coefficient generated by the picture feature amount converting step, and wherein a similar picture to the query picture is specified from the plurality of retrieval target pictures, based on a plurality of the calculated similarities.

A recording medium of the present invention is a recording medium that can be read in by a computer, which records a program for instructing a computer to execute the respective steps described in the picture retrieving method of the present invention.

A picture retrieving apparatus of the present invention includes: an orthogonal conversion coefficient memory storing a plurality of orthogonal conversion coefficients of a plurality of retrieval target pictures targeted for a retrieval; a picture feature amount converter converting a color histogram information of a query picture into an orthogonal conversion coefficient; and an orthogonal conversion coefficient similarity calculator calculating a similarity between the orthogonal conversion coefficient generated by the picture feature amount converter and the orthogonal conversion coefficient read from the orthogonal conversion coefficient memory.

A picture retrieving method of the present invention includes: a step of storing a plurality of orthogonal conversion coefficients of a plurality of retrieval target pictures targeted for a retrieval in an orthogonal conversion coefficient memory; a picture feature amount converting step of converting a color histogram information of a query picture into an orthogonal conversion coefficient; and an orthogonal conversion coefficient similarity calculating step of calculating a similarity between the orthogonal conversion coefficient generated by the picture feature amount converting step and the orthogonal conversion coefficient read from the orthogonal conversion coefficient memory, and wherein a similar picture to the query picture is specified from the plurality of retrieval target pictures, based on a plurality of the calculated similarities.

A recording medium of the present invention is a recording medium that can be read in by a computer, which records a program for instructing a computer to execute the respective steps described in the picture retrieving method of the present invention.

In the picture retrieving apparatus of the present invention, the picture feature amount converter includes: an average color calculator calculating an average color from a color histogram information, and an orthogonal conversion coefficient generator generating an orthogonal conversion coefficient with the calculated average color as a direct current component.

In the picture retrieving apparatus of the present invention, each of the picture feature amount converter and the second picture feature amount converter includes: an average color calculator calculating an average color from a color histogram information, and an orthogonal conversion coefficient generator generating an orthogonal conversion coefficient with the calculated average color as a direct current component.

In the picture retrieving apparatus of the present invention, the picture feature amount converter includes: an average color calculator calculating an average color from a color histogram information, and an orthogonal conversion coefficient, generator generating an orthogonal conversion coefficient with the calculated average color as a direct current component.

In the picture retrieving method of the present invention, the picture feature amount converting step includes: an average color calculating step of calculating an average color from a color histogram information; and an orthogonal conversion coefficient generating step of generating an orthogonal conversion coefficient with the calculated average color as a direct current component.

In the picture retrieving method of the present invention, each of the picture feature amount converting step and the second picture feature amount converting step includes: an average color calculating step of calculating an average color from a color histogram information; and an orthogonal conversion coefficient generating step of generating an orthogonal conversion coefficient with the calculated average color as a direct current component.

In the picture retrieving method of the present invention, the picture feature amount converting step includes: an average color calculating step of calculating an average color from a color histogram information; and an orthogonal conversion coefficient generating step of generating an orthogonal conversion coefficient with the calculated average color as a direct current component.

A recording medium of the present invention is a recording medium that can be read in by a computer, which records a program for instructing a computer to execute the respective steps described in the picture retrieving method of the present invention.

A recording medium of the present invention is a recording medium that can be read in by a computer, which records a program for instructing a computer to execute the respective steps described in the picture retrieving method of the present invention.

A recording medium of the present invention is a recording medium that can be read in by a computer, which records a program for instructing a computer to execute the respective steps described in the picture retrieving method of the present invention.

In the configuration of the present invention, by using the reversely orthogonal conversion, the orthogonal conversion coefficient of the input picture is decoded to convert into the picture, and the color histogram information is extracted from the decoded picture, or the average color is calculated from the input color histogram information, and the orthogonal conversion coefficient is generated with the calculated average color as the direct current component, by using the orthogonal conversion. Thus, in the system in which the color histogram information and the orthogonal conversion coefficient of the picture are mixed, as the picture feature amount, it is possible to convert the kinds of the picture feature amounts into each other. Accordingly, it is possible to unify the kinds of the picture feature amounts. Hence, in the system in which the picture retrieval using the color histogram information and the picture retrieval using the orthogonal conversion coefficient of the picture are mixed, the similar picture can be retrieved independently of the kind of the picture feature amount, and the similarity between the pictures can be calculated only by using one kind of a similarity calculator.

BRIEF DESCRIPTION OF DRAWINGS

FIG. 7 is a view showing a normalizing average retrieval order when an orthogonal conversion coefficient is used as a picture feature amount, in an example of the present invention;

FIG. 8 is a view showing a normalizing average retrieval order when a color histogram information is used as a picture feature amount, in an example of the present invention;

BEST MODE FOR CARRYING OUT THE INVENTION

An embodiment of the present invention will be described below with reference to the attached drawings.

Figure 1:
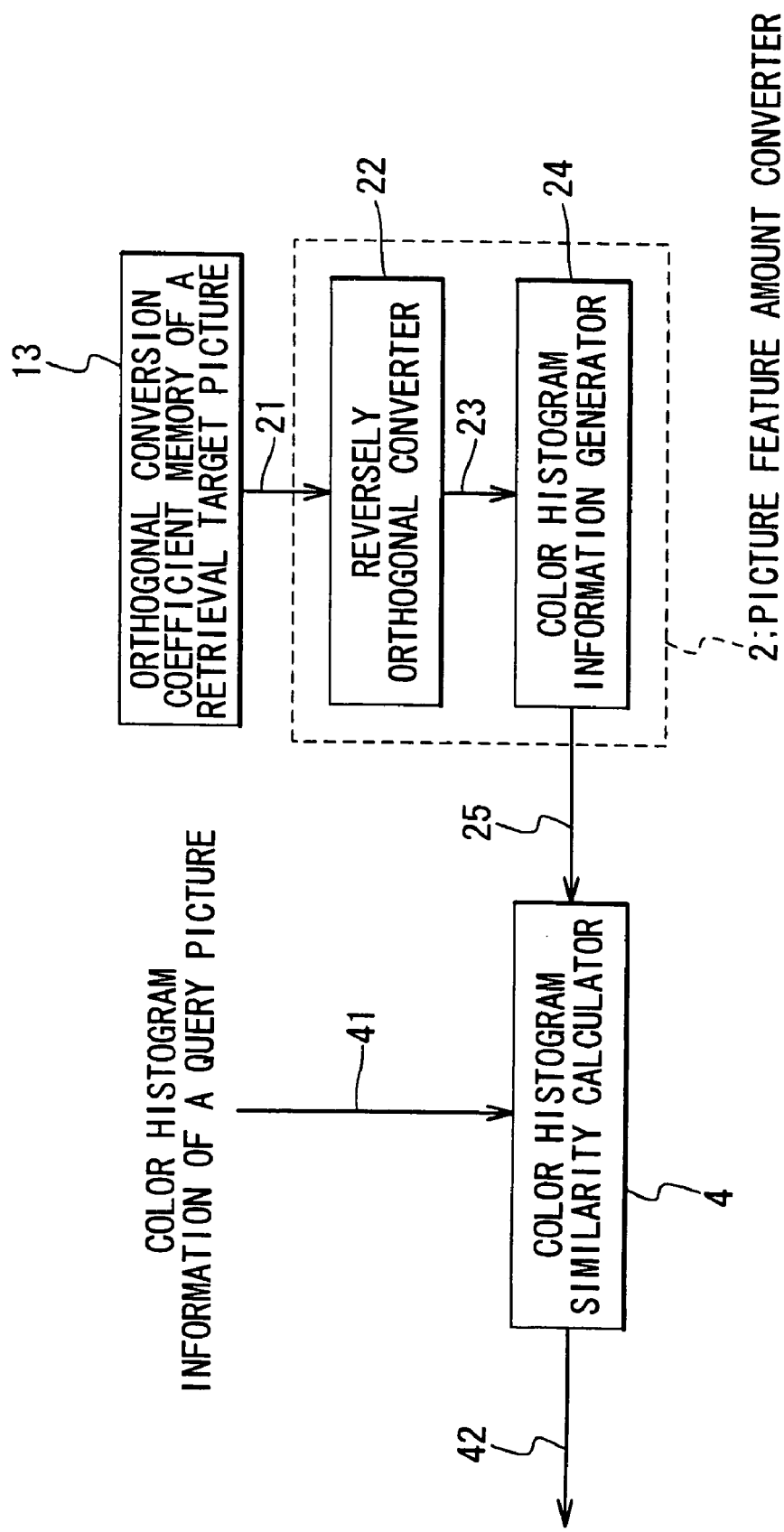
FIG. 1 is a block diagram showing a configuration of a first embodiment of a picture retrieving apparatus of the present invention.
Figure 2:
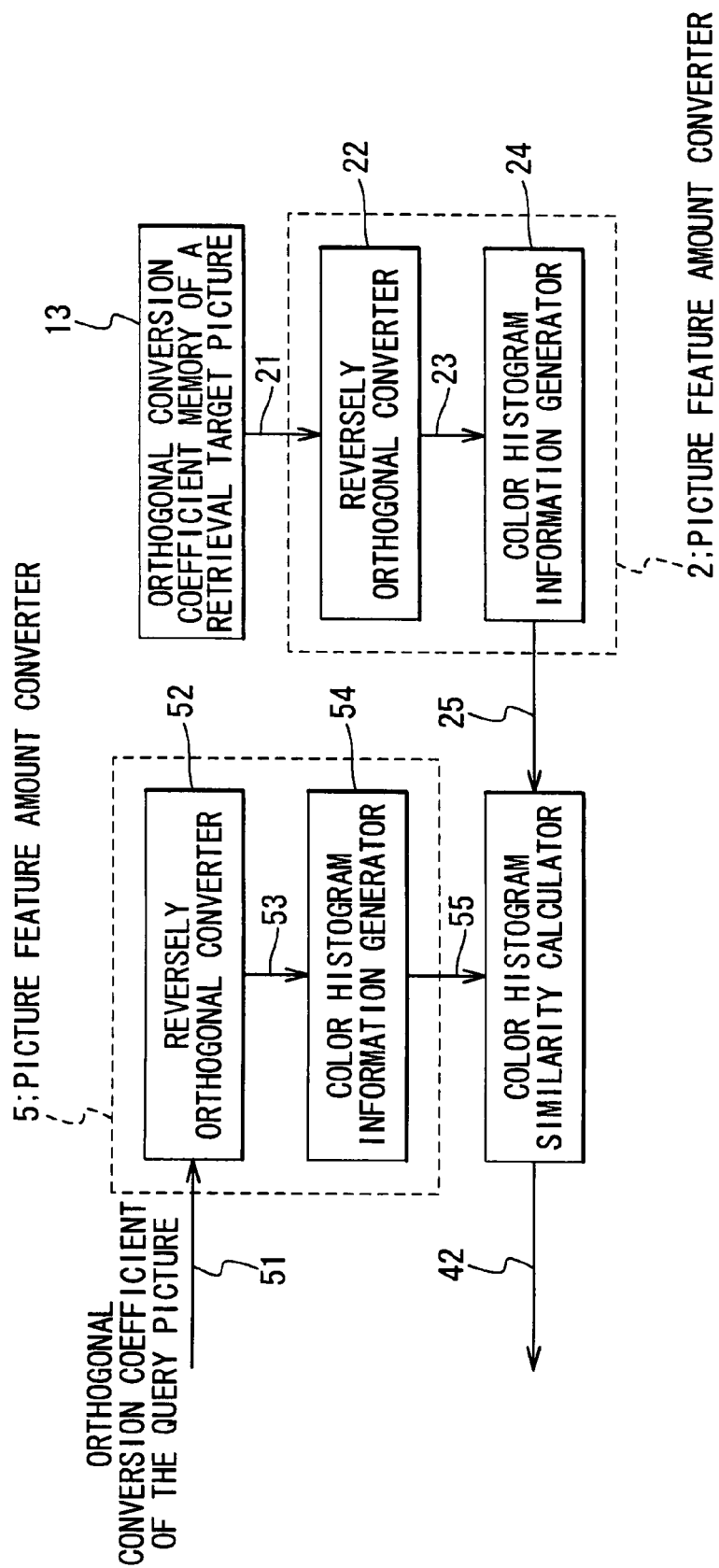
FIG. 2 is a block diagram showing a configuration of a second embodiment of a picture retrieving apparatus of the present invention.
Figure 3:
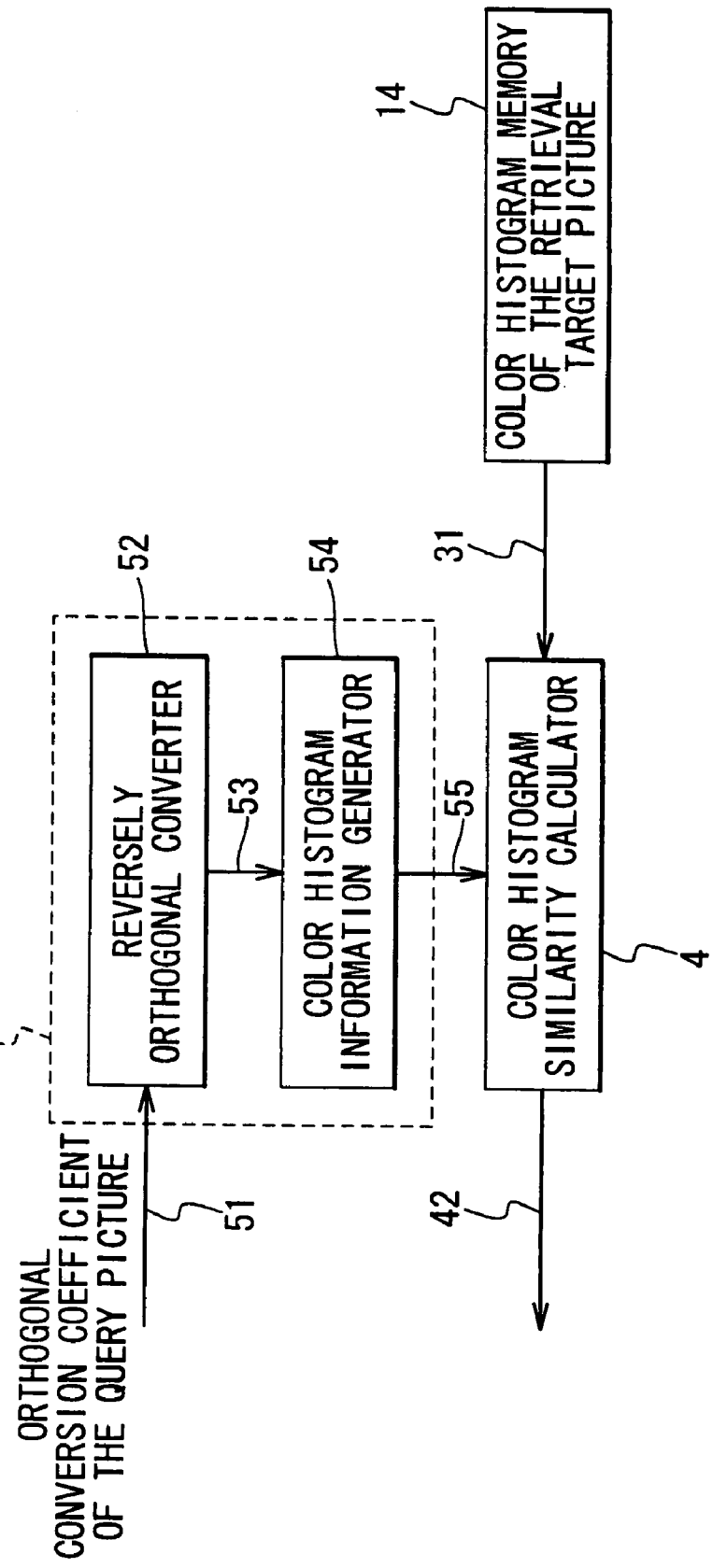
FIG. 3 is a block diagram showing a configuration of a third embodiment of a picture retrieving apparatus of the present invention.
Figure 4:
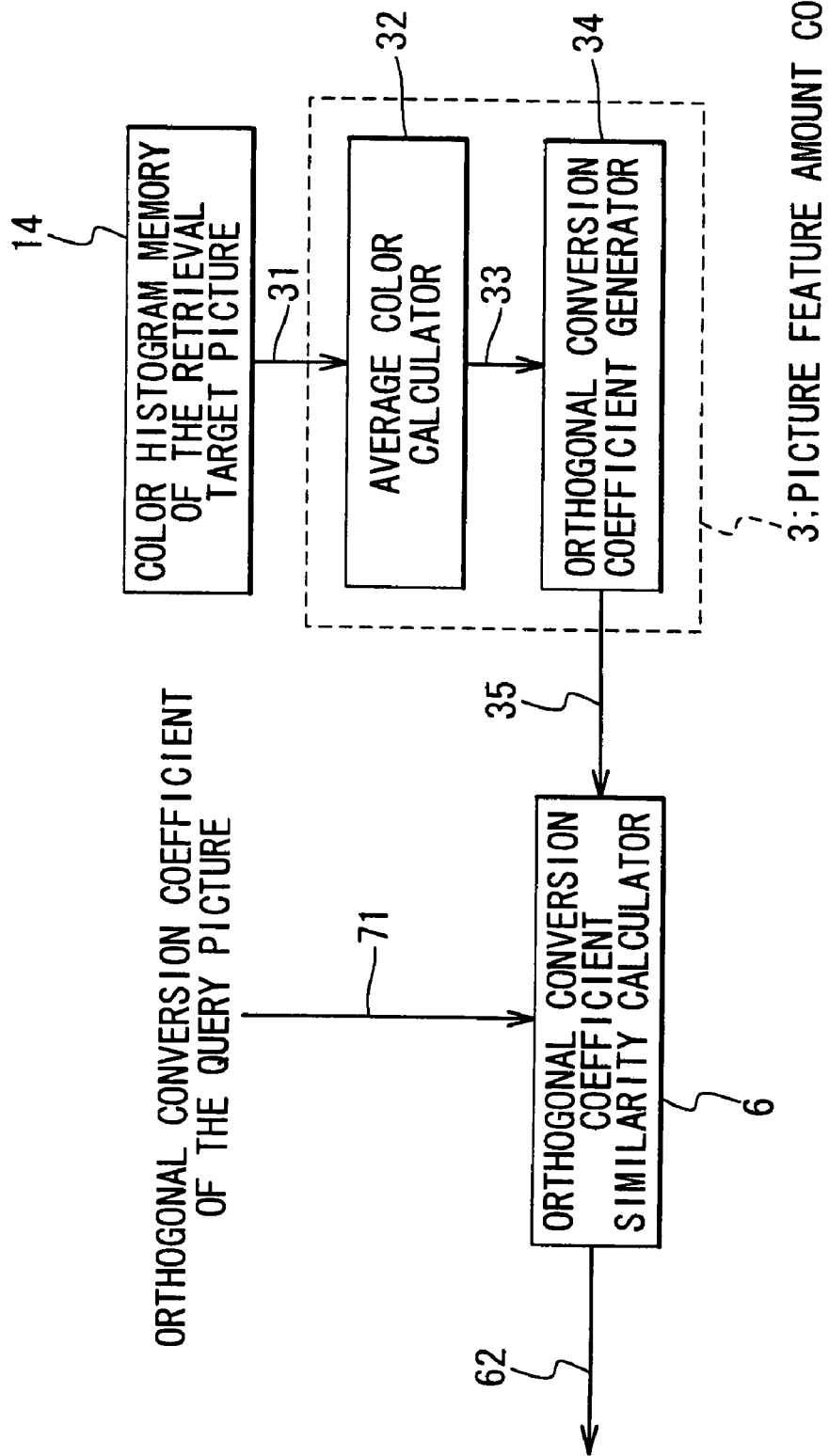
FIG. 4 is a block diagram showing a configuration of a fourth embodiment of a picture retrieving apparatus of the present invention.
Figure 5:
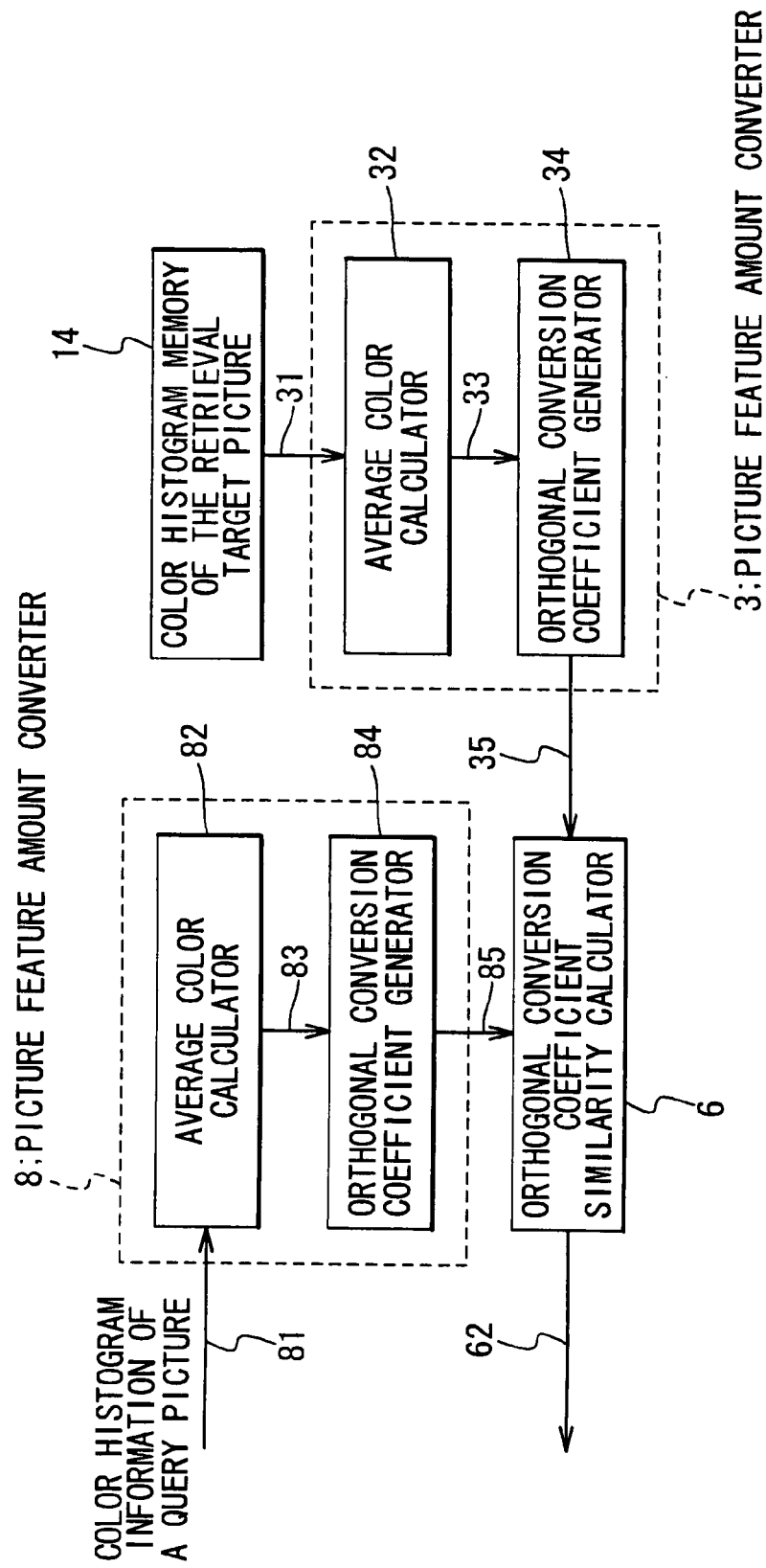
FIG. 5 is a block diagram showing a configuration of a fifth embodiment of a picture retrieving apparatus of the present invention.
Figure 6:
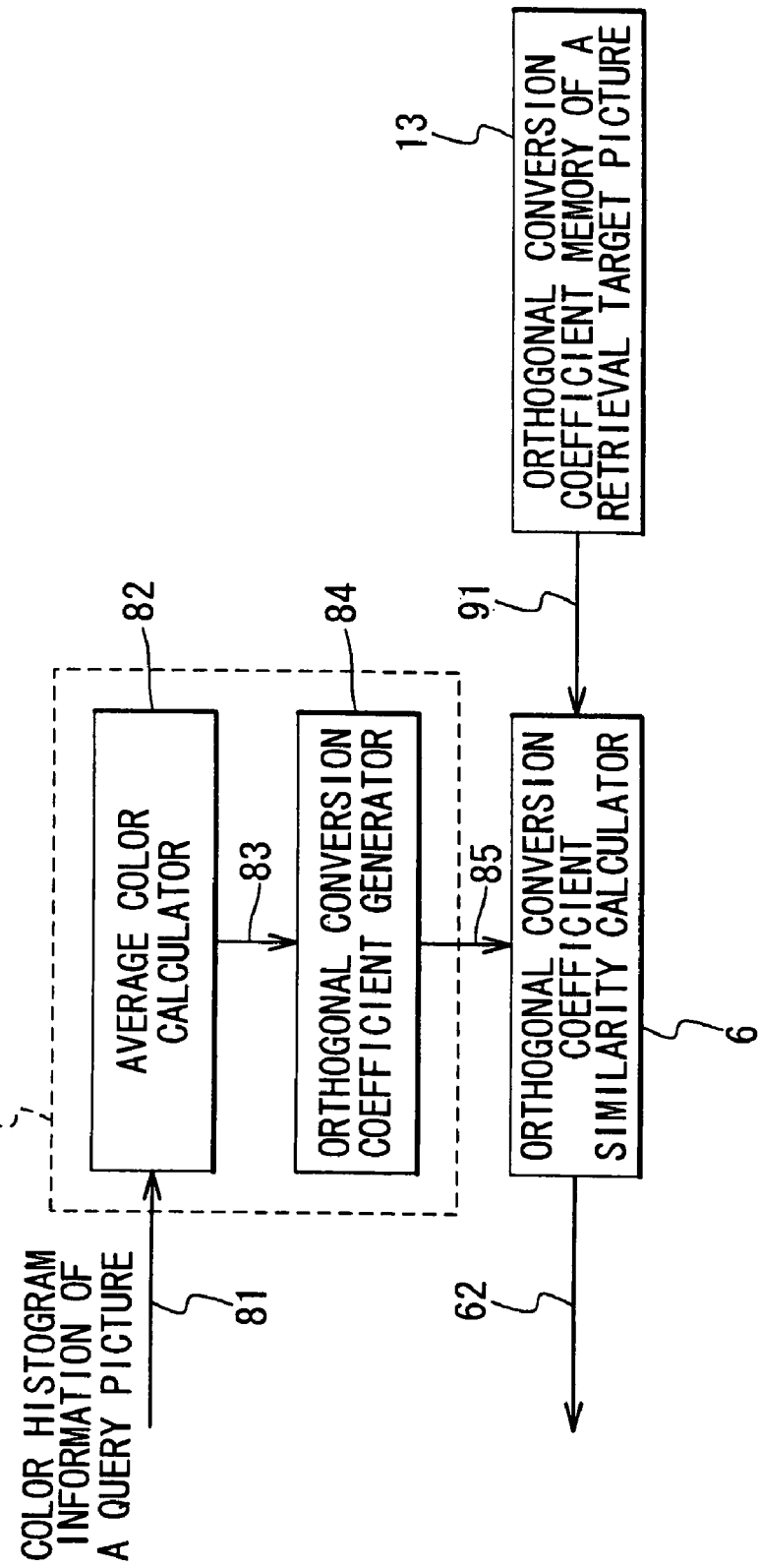
FIG. 6 is a block diagram showing a configuration of a sixth embodiment of a picture retrieving apparatus of the present invention.
Figure 9:
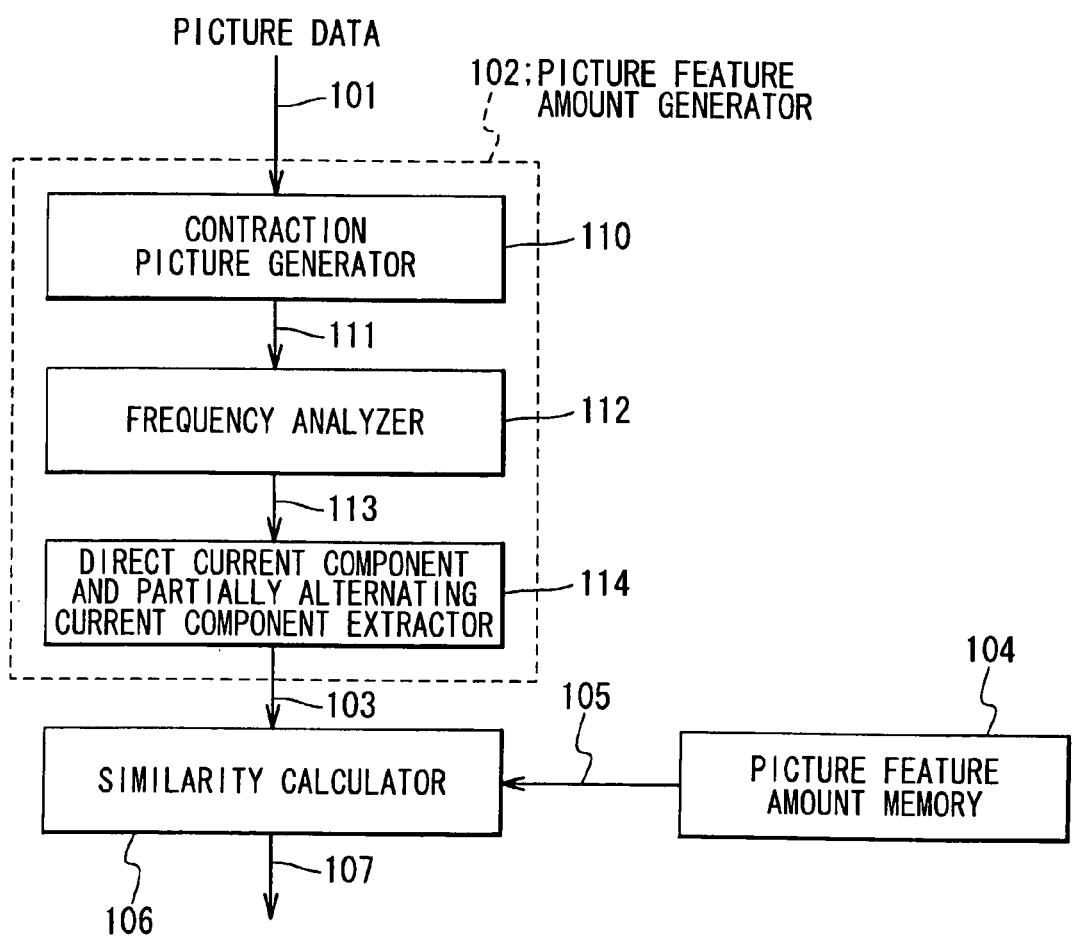
FIG. 9 is a block diagram (1) showing a configuration of a main portion of a conventional picture retrieving apparatus.
Figure 10:
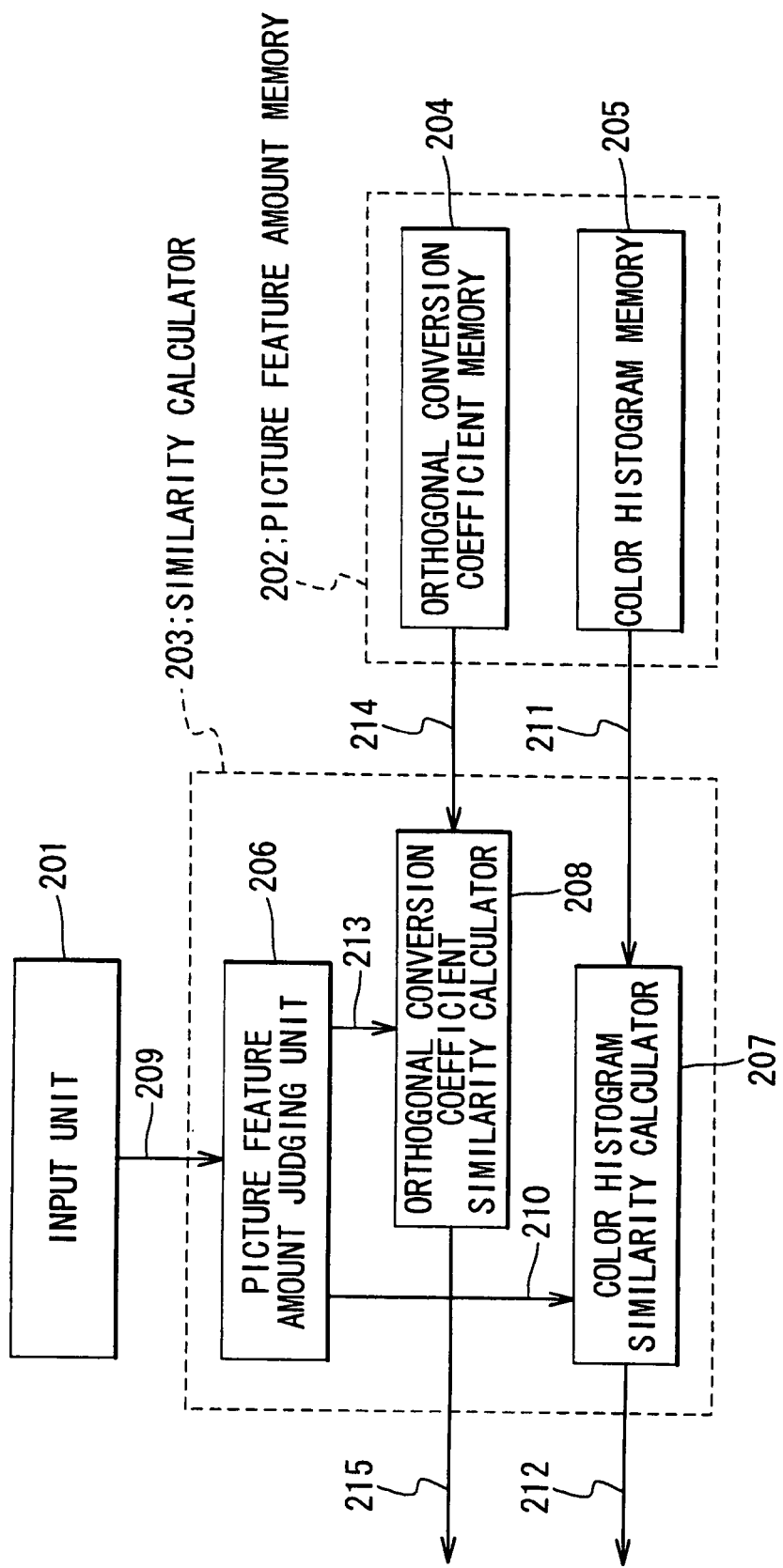
FIG. 10 is a block diagram (2) showing a configuration of a main portion of a conventional picture retrieving apparatus.

FIG. 1 is a block diagram showing a configuration of a first embodiment of a picture retrieving apparatus of the present invention. FIG. 2 is a block diagram showing a configuration of a second embodiment of a picture retrieving apparatus of the present invention. FIG. 3 is a block diagram showing a configuration of a third embodiment of a picture retrieving apparatus of the present invention. FIG. 4 is a block diagram showing a configuration of a fourth embodiment of a picture retrieving apparatus of the present invention. FIG. 5 is a block diagram showing a configuration of a fifth embodiment of a picture retrieving apparatus of the present invention. FIG. 6 is a block diagram showing a configuration of a sixth embodiment of a picture retrieving apparatus of the present invention. FIG. 7 is a view showing a normalizing average retrieval order to the same picture database and query in a method of using a color histogram information extracted from a raw picture as a picture feature amount and a method of using a color histogram information generated by converting an orthogonal conversion coefficient as a picture feature amount. And, FIG. 8 is a view showing a normalizing average retrieval order to the same picture database and query in a method of using an orthogonal conversion coefficient extracted from a raw picture as a picture feature amount and a method of using an orthogonal conversion coefficient generated by converting a color histogram information as a picture feature amount.

FIRST EMBODIMENT

The picture retrieving apparatus of the first embodiment of the present invention includes: an orthogonal conversion coefficient memory 13 of a retrieval target picture, a picture feature amount converter 2 and a color histogram similarity calculator 4, as shown in FIG. 1. Moreover, the picture feature amount converter 2 is composed of a reversely orthogonal converter 22 and a color histogram information generator 24.

The orthogonal conversion coefficient memory 13 of the retrieval target picture stores an orthogonal conversion coefficient of a picture that is a picture feature amount of the retrieval target picture.

In the picture feature amount converter 2, the reversely orthogonal converter 22 performs the reversely orthogonal conversion on an orthogonal conversion coefficient 21 read from the orthogonal conversion coefficient memory 13 to output a decode picture 23. The color histogram information generator 24 extracts a color histogram information 25 from the input decode picture 23.

The color histogram similarity calculator 4 calculates a similarity 42 between a color histogram information 41 of a query picture inputted as a picture feature amount used for a query and the color histogram information 25 generated by the picture feature amount converter 2.

Thus, by calculating the similarity 42 between the color histogram information obtained by sequentially reading orthogonal conversion coefficients of a plurality of retrieval target pictures stored in the orthogonal conversion coefficient memory 13 and performing the conversion on them, and the color histogram information of the query picture, and then selecting the retrieval target picture on the basis of the degree of the calculated similarity, it is possible to specify the picture similar to the query picture from the plurality of retrieval target pictures whose orthogonal conversion coefficients are stored in the orthogonal conversion coefficient memory 13.

As mentioned above, according to the picture retrieving apparatus of the first embodiment of the present invention shown in FIG. 1, it calculates the similarity between the color histogram information into which the orthogonal conversion coefficient of the picture, which is the picture feature amount, is converted and the input color histogram information. Thus, both the color histogram information and the orthogonal conversion coefficient of the picture can be treated by the same similarity calculator. Hence, it is possible to drop the configuration size of the retrieving system.

Moreover, it is possible to provide the picture retrieving apparatus that can carry out the retrieval, whether the kind of the picture feature, amount is the orthogonal conversion coefficient or the color histogram information.

SECOND EMBODIMENT

The picture retrieving apparatus of the second embodiment of the present invention includes: the orthogonal conversion coefficient memory 13 of the retrieval target picture, the picture feature amount converter 2, a second picture feature amount converter 5 and the color histogram similarity calculator 4, as shown in FIG. 2. Moreover, the picture feature amount converter 2 is composed of the reversely orthogonal converter 22 and the color histogram information generator 24. Also, the second picture feature amount converter 5 is composed of a reversely orthogonal converter 52 and a color histogram information generator 54.

The orthogonal conversion coefficient memory 13 of the retrieval target picture stores the orthogonal conversion coefficient of the picture that is the picture feature amount of the retrieval target picture.

In the picture feature amount converter 2, the reversely orthogonal converter 22 performs the reversely orthogonal conversion on the orthogonal conversion coefficient 21 read from the orthogonal conversion coefficient memory 13 of the retrieval target picture to output the decode picture 23. The color histogram information generator 24 extracts the color histogram information 25 from the input decode picture 23.

In the second picture feature amount converter 5, the reversely orthogonal converter 52 performs the reversely orthogonal conversion on the orthogonal conversion coefficient 51 of the query picture inputted as the picture feature amount used for the query, and outputs the decode picture 53. The color histogram information generator 54 extracts a color histogram information 55 from the input decode picture 53.

The color histogram information similarity calculator 4 calculates the similarity 42 between the color histogram information 25 generated by the picture feature amount converter 2 and the color histogram information 55 generated by the second picture feature amount converter 5.

Thus, by calculating the similarity 42 between the color histogram information obtained by sequentially reading the orthogonal conversion coefficients of the plurality of retrieval target pictures stored in the orthogonal conversion coefficient memory 13, and performing the conversion on them, and the color histogram information of the query picture, and then selecting the retrieval target picture on the basis of the degree of the calculated similarity, it is possible to specify the picture similar to the query picture from the plurality of retrieval target pictures whose orthogonal conversion coefficients are stored in the orthogonal conversion coefficient memory 13.

As mentioned above, according to the picture retrieving apparatus of the second embodiment of the present invention shown in FIG. 2, it calculates the similarity between the color histogram information into which the orthogonal conversion coefficient of the picture, which is the picture feature amount, is converted, and the color histogram information into which the input orthogonal conversion coefficient is converted. Thus, without any inclusion of the orthogonal conversion coefficient similarity calculator, the color histogram information similarity calculator 4 can carry out the comparison between the orthogonal conversion coefficients. Hence, it is possible to drop the configuration size of the retrieving system.

Moreover, it is possible to provide the picture retrieving apparatus that can carry out the retrieval, whether the kind of the picture feature amount is the orthogonal conversion coefficient or the color histogram information.

THIRD EMBODIMENT

The picture retrieving apparatus of the third embodiment of the present invention includes: a color histogram memory 14 of the retrieval target picture, the picture feature amount converter 5 and the color histogram similarity calculator 4, as shown in FIG. 3. Moreover, the picture feature amount converter 5 is composed of the reversely orthogonal converter 52 and the color histogram information generator 54.

The color histogram memory 14 of the retrieval target picture stores the color histogram information that is the picture feature amount of the retrieval target picture.

In the picture feature amount converter 5, the reversely orthogonal converter 52 performs the reversely orthogonal conversion on the orthogonal conversion coefficient 51 of the query picture inputted as the picture feature amount used for the query to output the decode picture 53. The color histogram information generator 54 extracts the color histogram information 55 from the input decode picture 53.

The color histogram information similarity calculator 4 calculates the similarity 42 between the color histogram information 55 generated by the picture feature amount converter 5 and a color histogram information 31 read from the color histogram memory 14 of the retrieval target picture.

Thus, by calculating the similarity 42 between the color histogram information obtained by sequentially reading the color histogram information of the plurality of retrieval target pictures stored in the color histogram memory 14, and the color histogram information into which the orthogonal conversion coefficient of the query picture is converted, and then selecting the retrieval target picture on the basis of the degree of the calculated similarity, it is possible to specify the picture similar to the query picture from the plurality of retrieval target pictures whose color histogram information are stored in the color histogram memory 14.

As mentioned above, according to the picture retrieving apparatus of the third embodiment of the present invention shown in FIG. 3, it calculates the similarity between the color histogram information into which the orthogonal conversion coefficient of the input picture is converted and the color histogram information which is the picture feature amount. Thus, both the color histogram information and the orthogonal conversion coefficient can be treated by the same similarity calculator. Hence, it is possible to drop the configuration size of the retrieving system.

Moreover, it is possible to provide the picture retrieving apparatus that can carry out the retrieval, whether the kind of the picture feature amount is the orthogonal conversion coefficient or the color histogram information.

FOURTH EMBODIMENT

The picture retrieving apparatus of the fourth embodiment of the present invention includes: the color histogram memory 14 of the retrieval target picture, the picture feature amount converter 3 and an orthogonal conversion coefficient similarity calculator 6, as shown in FIG. 4. Moreover, the picture feature amount converter 3 is composed of an average color calculator 32 and an orthogonal conversion coefficient generator 34.

The color histogram memory 14 of the retrieval target picture stores the color histogram information that is the picture feature amount of the retrieval target picture.

In the picture feature amount converter 3, the average color calculator 32 calculates an average color of the picture from the color histogram information 31 of the picture, which is the picture feature amount read from the color histogram memory 14 of the retrieval target picture to output an average color 33 of the picture. Here, the average color implies an average value of the colors included in the color histogram, and it can be calculated by multiplying each color by each rate and then adding all of them. Also, in calculating the average color, the average color may be determined after each color is converted into a different color space. The orthogonal conversion coefficient generator 34 extracts an orthogonal conversion coefficient 35 in which the average color 33 of the input picture is used as a direct current component of the orthogonal conversion coefficient.

The orthogonal conversion coefficient similarity calculator 6 calculates a similarity 62 between an orthogonal conversion coefficient 71 of the query picture inputted as the picture feature amount used for the query and the orthogonal conversion coefficient 35 generated by the picture feature amount converter 3.

Thus, by calculating the similarity 62 between the orthogonal conversion coefficient obtained by sequentially reading the color histogram information of the plurality of retrieval target pictures stored in the color histogram memory 14 and performing the conversion on them, and the orthogonal conversion coefficient of the query picture, and then selecting the retrieval target picture on the basis of the degree of the calculated similarity, it is possible to specify the picture similar to the query picture from the plurality of retrieval target pictures whose color histogram information are stored in the color histogram memory 14.

As mentioned above, according to the picture retrieving apparatus of the fourth embodiment of the present invention shown in FIG. 4, it calculates the similarity between the orthogonal conversion coefficient inputted as the picture feature amount used for the query and the orthogonal conversion coefficient into which the color histogram information of the picture, which is the picture feature amount, is converted. Thus, both the color histogram information and the orthogonal conversion coefficient can be treated by the same similarity calculator. Hence, it is possible to drop the configuration size of the retrieving system.

Moreover, it is possible to provide the picture retrieving apparatus that can carry out the retrieval, whether the kind of the picture feature amount is the orthogonal conversion coefficient or the color histogram information.

FIFTH EMBODIMENT

The picture retrieving apparatus of the fifth embodiment of the present invention includes: the color histogram memory 14 of the retrieval target picture, the picture feature amount converter 3, a second picture feature amount converter 8 and the orthogonal conversion coefficient similarity calculator 6, as shown in FIG. 5. Moreover, the picture feature amount converter 3 is composed of the average color calculator 32 and the orthogonal conversion coefficient generator 34. Also, the second picture feature amount converter 8 is composed of an average color calculator 82 and an orthogonal conversion coefficient generator 84.

The color histogram memory 14 of the retrieval target picture stores the color histogram information that is the picture feature amount of the retrieval target picture.

In the picture feature amount converter 3, the average color calculator 32 calculates the average color of the picture from the color histogram information 31 of the picture, which is the picture feature amount read from the color histogram memory 14 of the retrieval target picture to output the average color 33 of the picture. The orthogonal conversion coefficient generator 34 extracts the orthogonal conversion coefficient 35 in which the average color 33 of the input picture is used as the direct current component of the orthogonal conversion coefficient.

In the second picture feature amount converter 8, the average color calculator 82 calculates the average color of the picture from the color histogram information 81 of the picture, which is the picture feature amount of the query picture to output the average color 83 of the picture. The orthogonal conversion coefficient generator 84 extracts an orthogonal conversion coefficient 85 in which the average color 83 of the input picture is used as the direct current component of the orthogonal conversion coefficient.

Here, the average color implies the average value of the colors included in the color histogram, and it can be calculated by multiplying each color by each rate and then adding all of them.

Also, in calculating the average color, the average color may be determined after each color is converted into a different color space.

The orthogonal conversion coefficient similarity calculator 6 calculates the similarity 62 between the orthogonal conversion coefficient 35 generated by the picture feature amount converter 3 and the orthogonal conversion coefficient 85 generated by the second picture feature amount converter 8.

Thus, by calculating the similarity 62 between the orthogonal conversion coefficient obtained sequentially reading the color histogram information of the plurality of retrieval target pictures stored in the color histogram memory 14 and performing the conversion on them, and the orthogonal conversion coefficient into which the color histogram information of the query picture is converted, and then selecting the retrieval target picture on the basis of the degree of the calculated similarity, it is possible to specify the picture similar to the query picture from the plurality of retrieval target pictures whose color histogram information are stored in the color histogram memory 14.

As mentioned above, according to the picture retrieving apparatus of the fifth embodiment of the present invention shown in FIG. 5, it calculates the similarity between the orthogonal conversion coefficient into which the color histogram information of the picture inputted as the picture feature amount used for the query is converted, and the orthogonal conversion coefficient into which the color histogram information of the picture, which is the picture feature amount, is converted. Thus, without any inclusion of the color histogram information similarity calculator, the comparison between the color histogram information can be treated by the orthogonal conversion coefficient similarity calculator 6. Hence, it is possible to drop the configuration size of the retrieving system.

Moreover, it is possible to provide the picture retrieving apparatus that can carry out the retrieval, whether the kind of the picture feature amount is the orthogonal conversion coefficient or the color histogram information.

SIXTH EMBODIMENT

The picture retrieving apparatus of the sixth embodiment of the present invention includes: the orthogonal conversion coefficient memory 13 of the retrieval target picture, the picture feature amount converter 8 and the orthogonal conversion coefficient similarity calculator 6, as shown in FIG. 6. Moreover, the picture feature amount converter 8 is composed of the average color calculator 82 and the orthogonal conversion coefficient generator 84.

The orthogonal conversion coefficient memory 13 of the retrieval target picture stores the orthogonal conversion coefficient of the picture that is the picture feature amount of the retrieval target picture.

In the picture feature amount converter 8, the average color calculator 82 calculates the average color of the picture from the color histogram information 81 of the picture, which is the picture feature amount of the query picture to output the average color 83 of the picture. Here, the average color implies the average value of the colors included in the color histogram, and it can be calculated by multiplying each color by each rate and then adding all of them. Also, in calculating the average color, the average color may be determined after each color is converted into a different color space. The orthogonal conversion coefficient generator 84 extracts the orthogonal conversion coefficient 85 in which the average color 83 of the input picture is used as the direct current component of the orthogonal conversion coefficient.

The orthogonal conversion coefficient similarity calculator 6 calculates the similarity 62 between the orthogonal conversion coefficient 85 generated by the picture feature amount converter 8 and an orthogonal conversion coefficient 91 read from the orthogonal conversion coefficient memory 13 of the retrieval target picture.

Thus, by calculating the similarity 62 between the orthogonal conversion coefficient obtained sequentially reading the orthogonal conversion coefficients of the plurality of retrieval target pictures stored in the orthogonal conversion coefficient memory 13, and the orthogonal conversion coefficient into which the color histogram information of the query picture is converted, and then selecting the retrieval target picture on the basis of the degree of the calculated similarity, it is possible to specify the picture similar to the query picture from the plurality of retrieval target pictures whose orthogonal conversion coefficients are stored in the orthogonal conversion coefficient memory 13.

As mentioned above, according to the picture retrieving apparatus of the sixth embodiment of the present invention shown in FIG. 6, it calculates the similarity between the orthogonal conversion coefficient into which the color histogram information of the picture inputted as the picture feature amount used for the query is converted, and the orthogonal conversion coefficient of the picture that is the picture feature amount. Thus, both the color histogram information and the orthogonal conversion coefficient can be treated by the same similarity calculator 6. Hence, it is possible to drop the configuration size of the retrieving system.

Moreover, it is possible to provide the picture retrieving apparatus that can carry out the retrieval, whether the kind of the picture feature amount is the orthogonal conversion coefficient or the color histogram information.

EMBODIMENT

The embodiment of the present invention will be described below.

In the embodiment, a database including 5466 sheets of picture is used to carry out a retrieval experiment. At this time, it is assumed that with regard to 50 query pictures, similar pictures are selected in advance by respective subjective evaluations and defined as correct answers.

The retrieval performance is evaluated by carrying out a realignment in an order starting from the similar similarity between the picture feature amounts of the picture included in the database and the query picture, and then evaluating the number and the order of the correct picture located within an n-th rank from a top rank as the normalizing average retrieval order.

By the way, the normalizing average retrieval order implies a value in which an average value of expected values for the orders of the correct pictures detected within the n-th rank from the top rank is normalized between 0 and 1. The smaller that value, the higher the performance. It was assumed that the n was the numeral equal to four times the number of the previously selected correct pictures, and that the correct answers which were not detected within the n-th from the top rank were all detected as an (n+1) rank.

The following two kinds were prepared as the picture feature amount.

The orthogonal conversion coefficient of the picture was used as a first picture feature amount. A generating method was carried out as follows. A static picture was divided into 8×8 blocks. An average color of each block was calculated to then generate a contraction picture of a fixed size (8 pixels×8 pixels). Next, a discrete cosine conversion (DCT conversion) was performed on the contraction picture. A low order coefficient row of a color difference signal and a brightness signal was extracted from the obtained coefficient. Moreover, the obtained DCT coefficient was converted by using a conversion table, and it was defined as a picture feature amount 1.

Moreover, the color histogram information was used as the other picture feature amount. One or more representative colors and their frequencies were extracted from each picture, and defined as a picture feature amount 2.

Next, the color histogram information was generated from the generated picture feature amount 1 (DCT coefficient) by using the method described below. The reversely orthogonal conversion was performed on the DCT coefficient so that the picture of 8×8 pixels was generated. Then, the color histogram information was extracted from the picture of 8×8 pixels. The extracted color histogram information was referred to as a picture feature amount 3.

Also, the DCT coefficient was generated from the generated picture feature amount 2 (color histogram information) by using the method described below. A product of a rate of a color frequency and a pixel value was determined for each representative color, and its sum was used as an average color information, and defined as a direct current component of the DCT coefficient. Accordingly, the DCT coefficient was generated. The generated DCT coefficient was referred to as a picture feature amount 4.

The normalizing average retrieval order was calculated when data sizes of the picture feature amount 1 of the orthogonal conversion coefficient and the picture feature amount 4 were made substantially equal to each other and data sizes of the picture feature amount 2 of the color histogram information and the picture feature amount 3 were made substantially equal to each other, and then the respective picture feature amounts were used to carry out the retrieval.

FIG. 7 is a view showing the normalizing average retrieval order when the orthogonal conversion coefficient is used as the picture feature amount, and FIG. 8 is a view showing the normalizing average retrieval order when the color histogram information is used as the picture feature amount.

From FIGS. 7, 8, as compared with the case when the orthogonal conversion coefficient and the color histogram information are generated from the raw picture, the normalizing average retrieval order is increased only by 0.03 at most in the case of the usage of the color histogram information and the orthogonal conversion coefficient generated by the conversion of the picture feature amount. Thus, it is understood that there is scarcely any fear of the reduction in the retrieval performance.

For this reason, both the color histogram information and the orthogonal conversion coefficient can be treated by he same similarity calculator. Thus, it is understood that the picture retrieving apparatus having the simplified system configuration can be provided without any large drop in the retrieval performance.

Moreover, it is possible to provide the picture retrieving apparatus that can carry out the retrieval, whether the kind of the picture feature amount is the orthogonal conversion coefficient or the color histogram information.

As mentioned above, the embodiments of the present invention have been described with reference to the drawings. However, the actual configuration is not limited to the embodiments. Even if, the change in the design without departing from the scope and spirit of the present invention is made, it is included in the present invention. For example, the kind of the color in the color histogram information is not limited to the particular color space. For example, any color space can be used among an RGB color space, a YCbCr color space, an HSV color space and the like. Also, in calculating the average color, it is not necessary to add all the component colors. Only a part of the colors may be used.

Also, if the method according to the present invention is attained by using a software, it can be easily attained by installing a program for carrying out the method of the present invention in a processing apparatus including: a main control unit containing a central processing unit (CPU); a memory unit composed of ROM, RAM, HDD and the like; an input output unit having a man-machine interface; a display; and the like, as a hardware configuration. Such a program is prepared in advance in a condition that it is recorded in a medium of any type that can be read by the processing apparatus. Then, if the similar system is included, the same method can be universally attained by reading such a program. As such a medium, it is possible to use any type of a magnetic tape, a floppy disc, a CD-ROM and the like.

As mentioned above, according to the picture retrieving apparatus and the picture retrieving method of the present invention, the picture similar to the query picture can be specified from the picture targeted for the retrieval, on the basis of the similarity of the picture feature amount, irrespectively of the kind of the used picture feature amount, by converting the picture feature amount and then unifying the kind. At this time, the retrieval performance is not largely dropped. Also, the same similarity calculator can be applied to the different picture feature amount. Thus, it is possible to simplify the configuration of the picture retrieving apparatus.

INDUSTRIAL APPLICABILITY

Typically, the picture retrieving method using the feature of the picture has been traditionally used to retrieve the similar picture from the accumulated pictures. In the present invention, the comparative retrieval can be done between the different kinds of the picture feature amounts. For example, if the picture feature amount of the query picture is the orthogonal conversion coefficient, the retrieval can be performed on the database having the color histogram information of the retrieval target picture as the feature amount.

The invention claimed is:

1. A picture retrieving apparatus, comprising:
    a first orthogonal coefficient generating section which outputs a set of orthogonal coefficients of each of a plurality of pictures as a retrieval target picture;
    a second orthogonal coefficient generating section which outputs a set of orthogonal coefficients of a query picture; and
    an orthogonal transform coefficient similarity calculator which calculates a similarity between said set of orthogonal transform coefficients of said query picture and said set of orthogonal transform coefficient of said retrieval target picture.
    wherein said first orthogonal transform coefficient generating section comprises:
        a color histogram memory which stores a plurality of color histogram data of said plurality of pictures; and
        a first picture feature data converter which converts said color histogram data of said retrieval target picture read from said color histogram memory into said set of orthogonal transform coefficients of said retrieval target picture, and outputs to said orthogonal transform coefficient similarity calculator.

2. The picture retrieving apparatus according to claim 1, wherein said first picture feature data converter comprises:
    an average color calculator which calculates an average color from said color histogram data of said retrieval target picture; and
    an orthogonal transform coefficient generating section which generates said set of orthogonal transform coefficient of said retrieval target picture using said calculated average color as a direct current component.

3. A picture retrieving apparatus comprising:
    a first orthogonal coefficient generating section which outputs a set of orthogonal coefficients of each of a plurality of pictures as a retrieval target picture;
    a second orthogonal coefficient generating section which outputs a set of orthogonal coefficients of a query picture; and
    an orthogonal transform coefficient similarity calculator which calculates a similarity between said set of orthogonal transform coefficients of said query picture and said set of orthogonal transform coefficient of said retrieval target picture,
    wherein said second orthogonal coefficient generating section comprises:
        a second picture feature data converter which converts a color histogram data of said query picture into said set of orthogonal transform coefficients.

4. The picture retrieving apparatus according to claim 3, wherein said second picture feature data converter comprises:
    an average color calculator which calculates an average color from said color histogram data of said query picture; and
    an orthogonal transform coefficient generating section which generates said set of orthogonal transform coefficients of said query picture using said calculated average color as a direct current component.

5. A picture retrieving method, comprising:
    (a) outputting a set of orthogonal coefficients of each of a plurality of pictures as a retrieval target picture;

(b) outputting a set of orthogonal coefficients of a query picture; and
(c) calculating a similarity between said set of orthogonal transform coefficients of said query picture and said set of orthogonal transform coefficient of said retrieval target picture.
wherein said step of (a) outputting comprises the steps of:
providing a plurality of color histogram data of said plurality of pictures;
(d) converting said color histogram data of said retrieval target picture into said set of orthogonal transform coefficients of said retrieval target picture; and
outputting said set of orthogonal transform coefficients of said retrieval target picture.

6. The picture retrieving method according to claim 5, wherein said step of (d) converting comprises the steps of:
calculating an average color from said color histogram data of said retrieval target picture; and
generating said set of orthogonal transform coefficient of said retrieval target picture using said calculated average color as a direct current component.

7. A picture retrieving method, comprising:
(a) outputting a set of orthogonal coefficients of each of a plurality of pictures as a retrieval target picture;
(b) outputting a set of orthogonal coefficients of a query picture; and
(c) calculating a similarity between said set of orthogonal transform coefficients of said query picture and said set of orthogonal transform coefficient of said retrieval target picture.
said step of (b) outputting comprises the step of:
(e) converting a color histogram data of said query picture into said set of orthogonal transform coefficients.

8. The picture retrieving method according to claim 7, wherein said step of (e) converting comprises the steps of:
calculating an average color from said color histogram data of said query picture; and
generating said set of orthogonal transform coefficients of said query picture using said calculated average color as a direct current component.

* * * * *